US010018186B2

(12) United States Patent
Bergua et al.

(10) Patent No.: US 10,018,186 B2
(45) Date of Patent: Jul. 10, 2018

(54) WIND TURBINES AND METHODS

(71) Applicant: ALSTOM RENEWABLE TECHNOLOGIES, Grenoble (FR)

(72) Inventors: Roger Bergua, Barcelona (ES); Jordi Jové, Barcelona (ES)

(73) Assignee: GE Renewable Technologies Wind B.V., Breda (NL)

( * ) Notice: Subject to any disclaimer, the term of this patent is extended or adjusted under 35 U.S.C. 154(b) by 660 days.

(21) Appl. No.: 14/592,501

(22) Filed: Jan. 8, 2015

(65) Prior Publication Data
US 2015/0204313 A1 Jul. 23, 2015

(30) Foreign Application Priority Data

Jan. 22, 2014 (EP) ..................................... 14382017

(51) Int. Cl.
*F03D 1/00* (2006.01)
*F03D 13/20* (2016.01)
*F03D 80/80* (2016.01)

(52) U.S. Cl.
CPC .............. *F03D 13/20* (2016.05); *F03D 1/00* (2013.01); *F03D 80/82* (2016.05); *F03D 80/88* (2016.05); *F05B 2240/14* (2013.01); *F05B 2240/912* (2013.01); *F05B 2260/964* (2013.01); *Y02E 10/726* (2013.01)

(58) Field of Classification Search
CPC .......... F03D 13/20; F03D 80/80; F03D 80/82; F03D 80/88; F05B 2240/14; F05B 2240/912; F05B 2260/964; Y02E 10/728
See application file for complete search history.

(56) References Cited

U.S. PATENT DOCUMENTS 6,672,837 B1 * 1/2004 Veldkamp ................. F16F 7/10
416/144
7,931,438 B2 * 4/2011 Schellings ................ F03D 1/00
415/119
2010/0314884 A1 12/2010 Ollgaard et al.
(Continued)

FOREIGN PATENT DOCUMENTS

WO WO 99/63219 12/1999

OTHER PUBLICATIONS

European Search Report for EP 14382017, dated Jun. 18, 2014, 5 pgs.

*Primary Examiner* — Jason Shanske
*Assistant Examiner* — Christopher R Lengendre
(74) *Attorney, Agent, or Firm* — Dority & Manning, P.A.

(57) ABSTRACT

Wind turbines are provided comprising a support structure having a tower and a nacelle mounted on the support structure. A first region (damper region) of the wind turbine including at least a first part of the nacelle is flexibly coupled to a second region (to be damped) of the wind turbine including at least the support structure. Methods are also provided for determining a suitable stiffness of the flexible coupling of the damper region to the region to be damped of any one of said wind turbines. These methods comprise determining a modal mass of the region to be damped depending on a given tower bending mode; and determining the stiffness of the flexible coupling of the damper region to the region to be damped depending on the calculated modal mass of the region to be damped and on the mass of the damper region.

9 Claims, 6 Drawing Sheets

(56) References Cited

U.S. PATENT DOCUMENTS

2012/0139256 A1*  6/2012  Gajewski .................. F03D 1/00
                                              290/55
2013/0195653 A1   8/2013  Hayashi et al.
2013/0280064 A1   10/2013 Van Steinvoren
2015/0204313 A1*  7/2015  Bergua .................... G01N 3/00
                                              416/145

* cited by examiner

WIND TURBINES AND METHODS

This application claims the benefit of European Patent Application No. 14382017.3 filed on Jan. 22, 2014, the entire contents of which are hereby incorporated by reference.

The present invention relates to wind turbines and to methods of determining a suitable stiffness for a flexible coupling of said wind turbines.

BACKGROUND ART

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. Said rotation is normally transmitted through a rotor shaft to a generator, either directly or through the use of a gearbox. This way, the generator can produce electricity which can be supplied to the electrical grid.

During operation of a wind turbine, the tower structure may undergo undesired vibrations, i.e. oscillatory or repeating displacements in any direction (fore-aft vibrations, side-to-side or lateral vibrations, longitudinal vibrations, torsional vibrations, etc.) of different amplitudes and frequencies (high or low, constant or varying). These vibrations may be caused by different factors, e.g. wind acting on the tower, blades passing along the tower and locally disturbing the wind flow, vibrations transmitted from the gearbox to the tower, rotor movements, nacelle imbalances, vibrations from the hub transmitted to the tower etc.

If a tower is subjected to vibrations during a prolonged period of time, fatigue damage may result. Fatigue damage may lead to a reduced life time of the wind turbine tower and/or its components. Furthermore, the danger exists that when vibrations cause resonance in the wind turbine tower, this can lead to a potentially dangerous increase of the vibrations. A further complicating factor is that the size of wind turbines (rotor, nacelle, tower, etc.) keeps increasing. Also, as towers become higher, the effect of vibrations becomes more critical.

A tuned mass damper, also known as a harmonic absorber, is a device mounted in structures to reduce the amplitude of structural vibrations. Their application can prevent discomfort, damage, or outright structural failure depending on the application. Tuned mass dampers are used to stabilize and protect against violent motion caused by harmonic vibration. A tuned mass damper aims at reducing the vibration of a system with a comparatively lightweight component so that the worst-case vibrations are less intense. Systems employing tuned mass dampers are tuned to either move the main mode away from a troubling excitation frequency, or to add damping to a resonance that is difficult or expensive to damp directly.

US2013280064 A1 discloses a wind turbine having a damper which may be a tuned mass damper. The damper is aimed at damping oscillations of the wind turbine, for example the periodic bending of the tower. The damper may be based on having a movable mass which can be a liquid (e.g. seawater) in a container.

A drawback of this type of wind turbine may be that the container and its content add an extra weight to the structure of the wind turbine. An increase in the weight of e.g. the nacelle may lead to a further increase in material and weight in the tower.

Another drawback may be that the container occupies a position and space which is not available for components that are essential to achieve the main purpose of the wind turbine: generation of electricity from the wind. The position and space occupied by the container may thus condition the position and space occupied by e.g. a main generator, a gearbox, a transformer, etc.

A further drawback of this type of wind turbine may be that the container may require its filling and/or emptying for e.g. maintenance reasons, tuning reasons (depending on the oscillations to be damped), etc. This filling and/or emptying may involve operations which may be relatively complex and expensive.

Still further drawbacks of this type of wind turbine may be that the container and possibly other related elements generally represent an extra cost in the sense of that they are not essential for the main purpose of the wind turbine (generation of electricity from the wind).

The present invention aims at resolving at least some of these problems.

SUMMARY

In a first aspect, the present invention provides a wind turbine comprising a support structure having a tower and a nacelle mounted on the support structure. A first region of the wind turbine including at least a first part of the nacelle is flexibly coupled to a second region of the wind turbine including at least the support structure, such that a tuned mass damper (TMD) is formed.

In accordance with TMD theory, the proposed wind turbine may be modelled as a system of two spring-mass-damper systems: the first region of the wind turbine ($k_1$, $m_1$, $c_1$) and the second region of the wind turbine ($k_2$, $m_2$, $c_2$). The second region would correspond to the structural part of the wind turbine which may oscillate with respect to the ground, and the first region would correspond to the part of the wind turbine aimed at damping said oscillations.

The second region of the wind turbine may therefore be seen as a mass $m_2$ mounted to the ground through a spring $k_2$ and a damper $c_2$. The first region of the wind turbine may be seen as a mass $m_1$ mounted on (or coupled to) the first mass $m_2$ through a spring $k_1$ and a damper $c_1$. The flexible coupling of the first region to the second region of the wind turbine would be the spring $k_1$ and damper $c_1$.

In this model, the parameter $m_2$ would not be the complete mass of the second region, but it would be the modal mass of said region, i.e. the mass of the second region that is moved as a result of a given oscillation. For example, if an element (or part of it) included in the second region is not moved as a result of a particular tower bending mode, the mass of said element (or part of it) would not be included in the modal mass $m_2$ of the second region for that tower bending mode.

Throughout the present disclosure, "flexibly coupled" and "flexible coupling" are used to denote couplings that relatively easily deforms or "give in" when subjected to a load. The flexible couplings herein may be elastic couplings, e.g. spring-like couplings. The flexible couplings herein may alternatively be substantially viscoelastic couplings, e.g. rubber-like couplings.

For the sake of clarity, onwards, the first region can also be referred to as the "damper region" and the second region can also be referred to as the "region to be damped". Throughout the rest of the description, reference is generally made to "elastic couplings". It should be understood however, that these couplings may be substantially elastic or substantially viscoelastic.

Apart from the tower, the support structure may comprise other elements such as e.g. a yaw system, a frame aimed at supporting at least the rotor, etc. In this case, the nacelle would be typically mounted on the yaw system and/or on said frame instead of being mounted on the tower. However, other configurations of wind turbines exist without yaw system between the tower and the nacelle.

A wind turbine nacelle is a cover housing that typically houses drive train components (such as e.g. rotor shaft, generator, gearbox, etc.) and electric or electronic components (such as e.g. transformer(s), converter(s), etc.). A nacelle may be seen as constituted by one or more "nacelle casings", each of them housing one or more of said drive train and electric/electronic components. The expression "a part of the nacelle" may thus be understood as referring to "a nacelle casing of the nacelle". Such a casing may comprise an essentially thin cover and a plurality of structural reinforcements supporting the cover and carrying most loads.

An aspect of the proposed wind turbine may be that a tuned mass damper is formed without including extra components expressly aimed at that function. Instead, the at least first part of the nacelle (e.g. a first "nacelle casing" and its content) would play the role of the mass m1 and the flexible coupling of the damper region to the region to be damped would play the role of the spring k1 and damper c1.

In some embodiments of the wind turbine, the whole nacelle may be included in the damper region of the wind turbine. In this case, the nacelle could be e.g. a single "nacelle casing" (mass m1) flexibly coupled to the region to be damped of the wind turbine. A suitable stiffness of the flexible coupling (spring k1 and damper c1) could make it possible to dampen fore-aft and/or side-to-side oscillations of a particular tower bending mode.

In the embodiments based on a single "nacelle casing", all the drive train and electric/electronic components may be housed in said nacelle casing and a flexible coupling may be arranged between the nacelle and the support structure.

According to configurations of the wind turbine, a second part of the nacelle (e.g. a second nacelle casing) may be rigidly coupled to the support structure, and therefore included in the region to be damped of the wind turbine. In this case, the mass m2 (of the wind turbine region to be damped) would include the modal mass of the support structure and said second part of the nacelle.

In some examples, the flexible coupling of the damper region to the region to be damped of the wind turbine may comprise a flexible coupling of the first part of the nacelle (e.g. first nacelle casing) to the support structure (tower and possibly a yaw system and/or a frame, etc.). Nevertheless, it is worth reminding that most wind turbines comprise a yaw system, which is typically arranged on top of the tower as an interface between said tower and a frame. In such cases, the flexible coupling may be arranged e.g. between said first part of the nacelle and the frame.

In embodiments, the flexible coupling of the damper region to the region to be damped of the wind turbine may comprise a flexible coupling of the first part of the nacelle (e.g. first nacelle casing included in the damper region) to the second part of the nacelle (e.g. second nacelle casing included in the region to be damped).

In some configurations, the first part of the nacelle may comprise a rear part of the nacelle (e.g. a rear nacelle casing included in the damper region) and the second part of the nacelle may comprise a front part of the nacelle (e.g. a front nacelle casing included in the region to be damped). In more particular configurations, the flexible coupling of the rear part of the nacelle to the front part of the nacelle may comprise a flexible coupling of a front side of the rear part of the nacelle to a rear side of the front part of the nacelle.

In some of these configurations based on front and rear nacelle parts, the wind turbine may further comprise first and second lateral walls extending rearwardly from the front nacelle part in such a way that the rear nacelle part is arranged at least partially between the first and second lateral walls. The first and second lateral walls may be rigidly coupled to the front nacelle part and/or to the support structure of the wind turbine. The first and second laterals walls may thus be included in the region to be damped of the wind turbine. The flexible coupling of the damper region to the region to be damped of the wind turbine may further comprise a flexible coupling of the rear part of the nacelle to the first lateral wall and a flexible coupling of the rear part of the nacelle to the second lateral wall.

The flexible coupling of the rear nacelle part to the front nacelle part may have a first stiffness suitable for damping a particular fore-aft tower bending mode. The flexible couplings of the rear nacelle part to the first and second lateral walls may have a second stiffness suitable for damping a particular side-to-side tower bending mode. Said first and second stiffnesses may be different. An aspect of this may thus be that fore-aft and side-to-side oscillations according to different tower bending modes may be damped.

In some embodiments, the first part of the nacelle may further comprise a first lateral nacelle part and a second lateral nacelle part. The first lateral part of the nacelle may be flexibly coupled to one lateral side of at least the front part of the nacelle. The second lateral part of the nacelle may be flexibly coupled to the opposite lateral side of at least the front part of the nacelle. Nacelles comprising two lateral parts suspended from a central portion may have benefits in providing access for maintenance. The first lateral nacelle part and the second lateral nacelle part may house different components.

An aspect of these last configurations may be that different fore-aft and side-to-side tower bending modes may be damped. The flexible coupling of the rear part of the nacelle to the front part of the nacelle may have a first stiffness suitable for damping a particular fore-aft tower bending mode. The flexible couplings of the lateral parts of the nacelle to at least the front part of the nacelle may have a second stiffness suitable for damping a particular side-to-side tower bending mode. The first stiffness and the second stiffness may be different depending on the tower bending modes to be damped.

Fore-aft oscillations herein may include also sorts of oscillations having a main component in a fore-aft plane, such as e.g. oscillations in which the tower sways back and forth in the direction parallel to the wind force and the rotor axis X (in other words, oscillations in the vertical plane defined by axes X and Z). Fore-aft oscillations may furthermore include further bending modes that e.g. include a main component in the fore-aft plane and an additional component including a rotation around the z-axis of a top part of the wind turbine (i.e. oscillations including some kind of torsional component apart from the fore-aft component).

In some embodiments based on front and rear nacelle parts, the rear part of the nacelle may house one or more electric/electronic components (e.g. transformer(s), converter(s), etc.) of the wind turbine, which would therefore be included in the damper region of the wind turbine. A suitable selection of those available electric/electronic components for its participation in the mass m1 of the damper region may be done depending on the tower bending mode to be damped. The front part of the nacelle may house the drive train components of the wind turbine, which would therefore be included in the wind turbine region to be damped.

In alternative embodiments, a first part of the drive train components may be housed in the front nacelle part (region to be damped) and a second part of the drive train components may be housed in the rear nacelle part (damper region). A typical flexible coupling may be arranged between these first and second parts of the drive train components (e.g. in a rotor shaft) for permitting a relative movement between them to impede stress induction due to operational deflections. This "typical" flexible coupling would not thus play any TMD role but it would simply permit a smooth torque transmission between e.g. a gearbox and a generator. The electric/electronic components may be suitably distributed among the front and rear nacelle parts.

In other alternative embodiments, all the drive train components may be housed in the rear nacelle part. A typical flexible coupling may be arranged between the drive train components and the wind turbine rotor (e.g. in a rotor shaft) for permitting a relative movement between them to impede stress induction due to operational deflections. This "typical" flexible coupling would not thus play any TMD role but it would permit a smooth torque transmission between the rotor and e.g. a gearbox. The electric/electronic components may be suitably distributed among the front and rear nacelle parts.

Alternatively to having front and rear nacelle parts, the second part of the nacelle may be a central part of the nacelle (e.g. a central nacelle casing) and the first part of the nacelle may comprise a first lateral nacelle part and a second lateral nacelle part (e.g. lateral nacelle casings). The elastic coupling of the first part to the second part of the nacelle may comprise a flexible coupling of the first lateral part of the nacelle to one lateral side of the central part of the nacelle, and a flexible coupling of the second lateral part of the nacelle to the opposite lateral side of the central part of the nacelle.

In some of these embodiments based on central and lateral parts, the lateral parts of the nacelle may house one or more electric/electronic components (e.g. transformer(s), converter(s), etc.) of the wind turbine, which would therefore be included in the damper region of the wind turbine. A suitable distribution of said electric/electronic components could be made among the lateral nacelle parts, depending on the tower bending mode to be damped. The central part of the nacelle may house the drive train components of the wind turbine, which would therefore be included in the wind turbine region to be damped.

In a second aspect, the invention provides a method of determining a suitable stiffness of the flexible coupling of the damper region to the region to be damped of any one of the wind turbines described before. The method comprises determining a modal mass of the region to be damped of the wind turbine depending on a given tower bending mode. The method further comprises determining the stiffness of the flexible coupling of the damper region to the region to be damped of the wind turbine depending on the calculated modal mass of the region to be damped of the wind turbine and on the mass of the damper region of the wind turbine.

In another aspect, another method may be provided for determining a suitable mass of the damper region of any one of the wind turbines described before. This method may comprise determining a modal mass of the wind turbine region to be damped depending on a given tower bending mode. The method further comprises determining the mass of the damper region of the wind turbine depending on the calculated modal mass of the wind turbine region to be damped and on a given stiffness of the elastic coupling of the damper region to the region to be damped of the wind turbine.

BRIEF DESCRIPTION OF THE DRAWINGS

Particular embodiments of the present invention will be described in the following by way of non-limiting examples, with reference to the appended drawings, in which.

DETAILED DESCRIPTION

In the following description, numerous specific details are set forth in order to provide a thorough understanding of examples of the present invention. It will be understood by one skilled in the art however, that examples of the present invention may be practiced without some or all of these specific details. In other instances, well known elements have not been described in detail in order not to unnecessarily obscure the description of the present invention.

Figure 1:
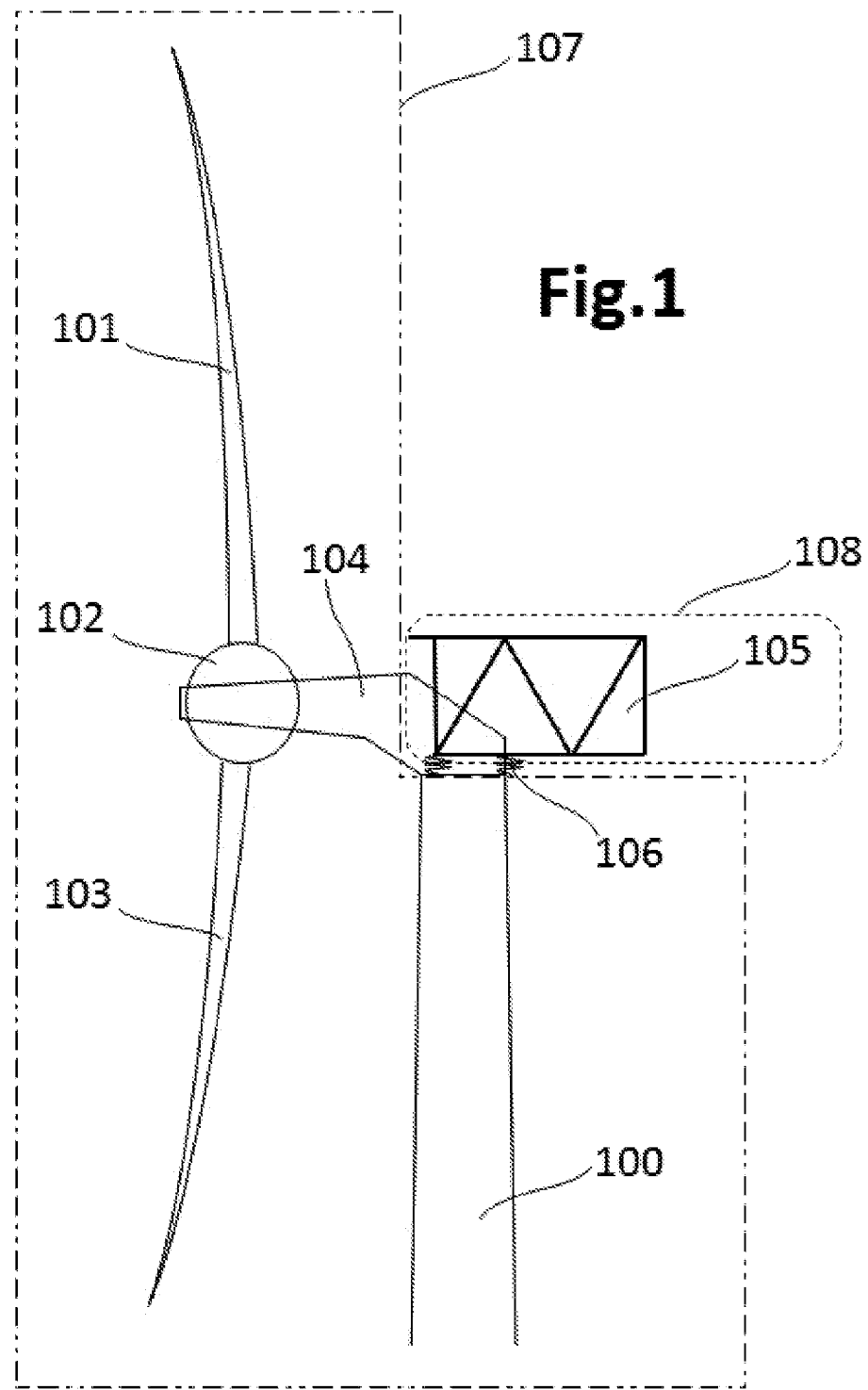
FIG. 1 is a schematic representation of a wind turbine according to an embodiment.

FIG. 1 is a schematic representation of a side view of a wind turbine according to an embodiment provided by the invention. The wind turbine is shown having a tower 100, a rotor 101-103 and a nacelle 105. The rotor comprises a hub 102 carrying a plurality of blades 101, 103. The wind turbine further comprises a frame 104 supporting the rotor 101-103. The tower 100 and the frame 104 constitute a supporting structure 100, 104 of the wind turbine.

The nacelle 105 is shown to be flexibly (elastically) coupled to the supporting structure 100, 104 through an elastic coupling 106 such that a tuned mass damper (TMD) is formed. Said elastic coupling 106 may elastically couple the nacelle 105 to the tower (as shown in FIG. 1) or to a yaw system (not shown) arranged on top of the tower 100 and/or to the frame 104.

From the point of view of the formed TMD, two relevant wind turbine regions may be distinguished: a damper region 108 and a region to be damped 107. The damper region 108 would be constituted, in this particular example, by the nacelle 105 and its "content" (i.e. the components housed within the nacelle), and the region to be damped 107 would be constituted by the supporting structure 100, 104 and the rotor 101-103. The damper region 108 plays the role of damping oscillations of the wind turbine region to be damped 107 with respect to the ground.

In the configuration of FIG. 1, fore-aft and/or side-to-side oscillations of the region to be damped 107 may cause the damper region 108 to oscillate (with respect to the region to be damped 107) in such a way that said fore-aft and/or side-to-side oscillations may be at least partially damped. These oscillations of the damper region 108 are produced because of the elastic coupling 106 between the damper region 108 and the region to be damped 107. A suitable stiffness for the elastic coupling 106 may be chosen depending on the tower bending mode to be damped.

Therefore, the frequency of the damper region 108 may be tuned to a structural frequency so that, when this frequency is excited, the damper region 108 may resonate out of phase with the structural motion. Energy may be dissipated by the damper inertia force acting on the structure.

In examples of the present invention, an elastic coupling may include e.g. elastic or viscoelastic materials such as rubbers. In particular examples, elastic couplings may include or be constituted by so-called "silent-blocks". Through a suitable design, the elastic coupling may have different stiffnesses in different directions and may act as a substantially rigid part in one direction and be more flexible in another direction.

Figure 2:
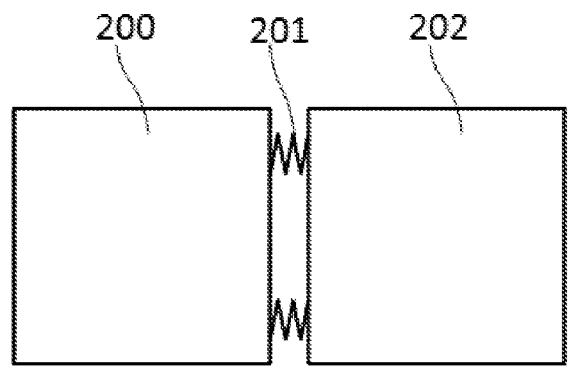
FIG. 2 is a schematic representation of a top view of a nacelle which may be used in embodiments of the present invention.

FIG. 2 is a schematic representation of a top view of a first nacelle arrangement suitable for different embodiments of the present invention. This nacelle is shown comprising a front nacelle casing 200, a rear nacelle casing 202 and an elastic coupling 201 between the front and rear nacelle casings 200, 202. The front nacelle casing 200 may be rigidly coupled to a wind turbine support structure such that the front nacelle casing 200 would be included in a wind turbine region to be damped 107 (see FIG. 1). The rear nacelle casing 202 would be a wind turbine damper region 108 (see FIG. 1).

Fore-aft and/or side-to-side oscillations of the wind turbine region to be damped 107 may cause the rear nacelle casing 202 to oscillate (with respect to the region to be damped 107) in such a way that said fore-aft and/or side-to-side oscillations may be at least partially damped. A suitable stiffness for the elastic coupling 201 may be chosen depending on the tower bending mode to be damped.

The rear nacelle casing 202 may further be elastically coupled to the wind turbine support structure in the same or similar way as explained before with respect the nacelle casing 105 of FIG. 1. The "double casing" nacelle 200, 202 of FIG. 2 could thus be used in the wind turbine of FIG. 1 instead of the "single casing" nacelle 105.

Figure 3:
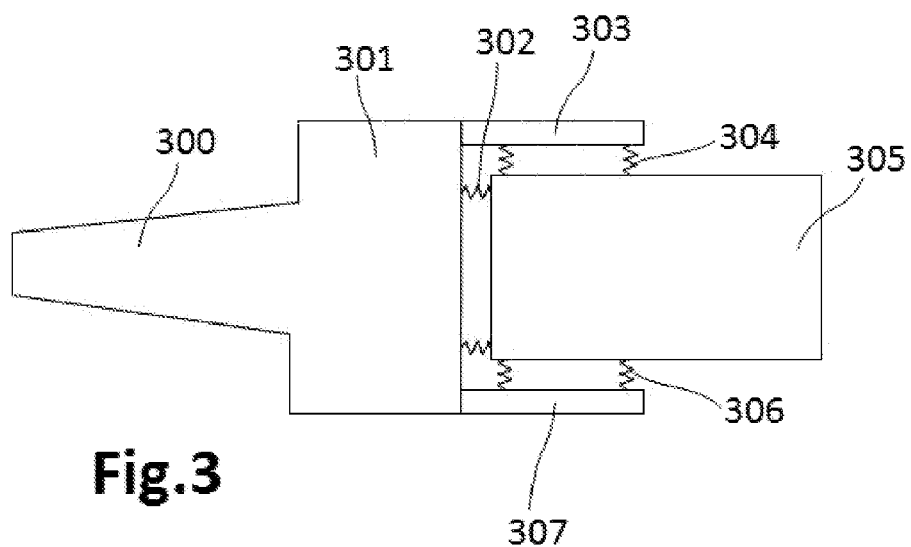
FIG. 3 is a schematic representation of a top view of another nacelle which may be used in embodiments of the present invention.

FIG. 3 is a schematic representation of a top view of another nacelle arrangement which may be used in embodiments of the present invention. This nacelle is shown comprising a front nacelle part or casing 301, a rear nacelle part or casing 305, and first and second lateral walls 303, 307. Said lateral walls 303, 307 extend rearwardly from the front nacelle part 301 in such a way that the rear nacelle part 305 is arranged at least partially between the lateral walls 303, 307. The front nacelle part 301 may be rigidly coupled to a part of a wind turbine support structure, such as e.g. a tower (not shown), a yaw system (not shown) or a frame 300 aimed at e.g. supporting a wind turbine rotor. The front nacelle part 301 would thus be included in a wind turbine region to be damped 107 (see FIG. 1).

The lateral walls 303, 307 may be rigidly coupled to the front part of the nacelle 301 and/or to the wind turbine support structure (e.g. frame 300). The lateral walls 303, 307 would thus also be included in the wind turbine region to be damped 107 (see FIG. 1). The rear nacelle part 305 would be included in a wind turbine damper region 108 (see FIG. 1). In this case, the elastic coupling of the damper region 108 to the region to be damped 107 would comprise three elastic couplings 302, 304, 306. The coupling 302 elastically couples the rear nacelle part 305 to the front nacelle part 301, the coupling 304 elastically couples the rear nacelle part 305 to the first lateral wall 303, and the coupling 306 elastically couples the rear nacelle part 305 to the second lateral wall 307.

The configuration of FIG. 3 may also permit damping fore-aft and side-to-side oscillations according to different tower bending modes. The elastic coupling 302 of the rear nacelle part 305 to the front nacelle part 301 may have a first stiffness suitable for a particular fore-aft tower bending mode. The elastic couplings 304, 306 of the rear nacelle part 305 to the lateral walls 303, 307 may have a second stiffness suitable for a particular side-to-side tower bending mode. Said first and second stiffnesses may be different or not depending on the tower bending modes to be damped.

The rear nacelle casing 305 may further be elastically coupled to the wind turbine support structure in the same or similar way as explained before with respect the nacelle casing 105 of FIG. 1. The "double casing" nacelle 301, 305 of FIG. 3 could thus be used in the wind turbine of FIG. 1 instead of the "single casing" nacelle 105.

Similarly, frame 300 may be of the type shown in FIG. 1 that extends forward and at a distal end rotatably supports a hub. Alternatively, the frame 300 does not directly support the hub, but rather rotatably supports the rotor shaft upon which the hub is mounted.

Figure 4:
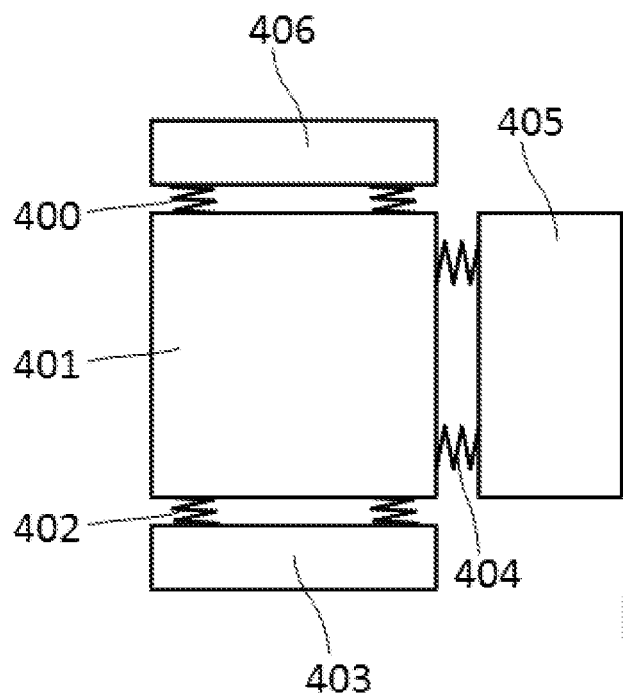
FIG. 4 is a schematic representation of a top view of another nacelle that may be used in embodiments of the present invention.

FIG. 4 is a schematic representation of a top view of a further nacelle arrangement suitable for embodiments of the present invention. This nacelle is shown comprising a front nacelle part or casing 401, a rear nacelle part or casing 405, and first and second lateral nacelle parts 403, 406. The front nacelle part 401 may be rigidly coupled to a part of a support structure of the wind turbine, such as a tower (not shown), a yaw system (not shown) or a frame (not shown) aimed at e.g. supporting a wind turbine rotor. The front nacelle part 401 would thus be included in a wind turbine region to be damped 107 (see FIG. 1).

In this case, three elastic couplings 400, 402, 404 are used. Each of these couplings may include more than one connection point such as illustrated in FIG. 4. The coupling 404 elastically couples the rear nacelle part 405 to the front nacelle part 401. The coupling 402 elastically couples the first lateral nacelle part 403 to the front nacelle part 401. The coupling 400 elastically couples the second lateral nacelle part 406 to the front nacelle part 401. The rear nacelle part 405 and the first and second lateral nacelle parts 403, 406 would therefore be included in a corresponding wind turbine damper region 108 (see FIG. 1).

The configuration of FIG. 4 may also permit damping fore-aft and side-to-side oscillations according to different tower bending modes. The elastic coupling 404 of the rear nacelle part 405 to the front nacelle part 401 may have a first stiffness suitable for a particular fore-aft tower bending mode. The elastic couplings 400, 402 of the lateral nacelle parts 403, 406 to the front nacelle part 401 may have a second stiffness suitable for a particular side-to-side tower bending mode. Said first and second stiffnesses may be different depending on the tower bending modes to be damped.

Figure 5:
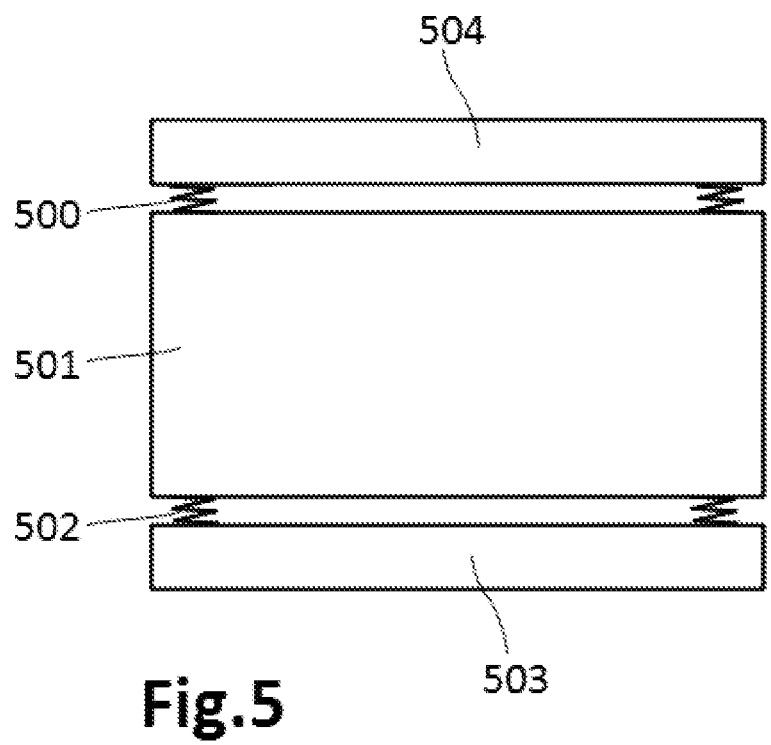
FIG. 5 is a schematic representation of a top view of yet another nacelle suitable for embodiments of the wind turbine.

FIG. 5 is a schematic representation of a top view of yet a further nacelle arrangement which may be used in examples of the present invention. This nacelle is shown comprising a central nacelle part 501 and first and second lateral nacelle parts 503, 504. The central nacelle part 501 may be rigidly coupled to a part of a wind turbine support structure, such as e.g. a tower (not shown), a yaw system (not shown) or a frame (not shown) aimed at e.g. supporting a wind turbine rotor. The central nacelle part 501 would thus be included in a wind turbine region to be damped 107 (see FIG. 1).

In this configuration, two elastic couplings 500, 502 are used. Each of these couplings could include more than one connection point of coupling element. The coupling 502 elastically couples the first lateral nacelle part 503 to the central nacelle part 501, and the coupling 500 elastically couples the second lateral nacelle part 504 to the central nacelle part 501. The first and second lateral nacelle parts 503, 504 would therefore be included in a corresponding wind turbine damper region 108 (see FIG. 1).

The configuration of FIG. 5 may be particularly suitable for damping side-to-side oscillations according to a particular tower bending mode. A suitable stiffness of the elastic couplings 500, 502 according to that aim may be selected depending on the particular tower bending mode to be damped and on the mass distribution within the nacelle.

Figure 6:
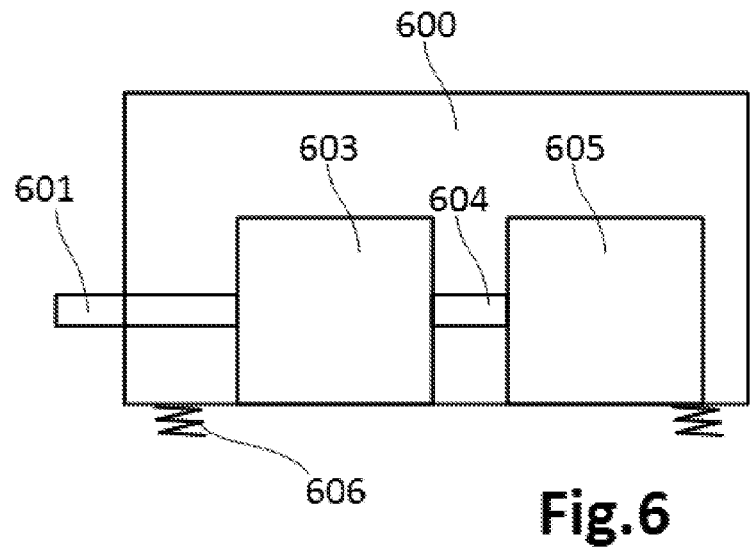
FIG. 6 is a schematic representation of a lateral view of yet another nacelle arrangement that may be used in embodiments of the present invention.

FIG. 6 is a schematic representation of a lateral view of yet another nacelle arrangement suitable for embodiments of the present invention. This nacelle comprises a nacelle casing 600 housing a main generator 605, a gearbox 603, and a high speed rotor shaft 604 operationally coupling the gearbox 603 to the main generator 605. A low speed rotor shaft 601 is also shown. A first end of said low speed rotor shaft 601 may be coupled to a wind turbine rotor (not shown) and a second end of said low speed rotor shaft 601 may be coupled to the gearbox 603.

The nacelle casing 600 may be elastically coupled to a wind turbine support structure (not shown) through a suitable elastic coupling 606. In this case, the nacelle casing 600 may therefore be the single nacelle casing 105 of FIG. 1 or the central nacelle casing 501 of FIG. 5, for example. The nacelle casing 600 may also be a rear nacelle casing elastically coupled to a front nacelle casing through another elastic coupling (not shown). In this last case, the nacelle casing 600 may therefore be the rear nacelle casing 202 of FIG. 2, the rear nacelle casing 305 of FIG. 3, or the rear nacelle casing 405 of FIG. 4, for example. In all these cases, the nacelle casing 600 would constitute a wind turbine damper region 108 (see FIG. 1) elastically coupled to a corresponding wind turbine region to be damped 107 (see FIG. 1).

The second end of the low speed rotor shaft 601 may be coupled to the gearbox 603 through a typical flexible coupling for permitting a smooth torque transmission (without stress induction) from the wind turbine rotor (not shown) to the gearbox 603. This typical flexible coupling would not therefore play any TMD role.

Figure 7:
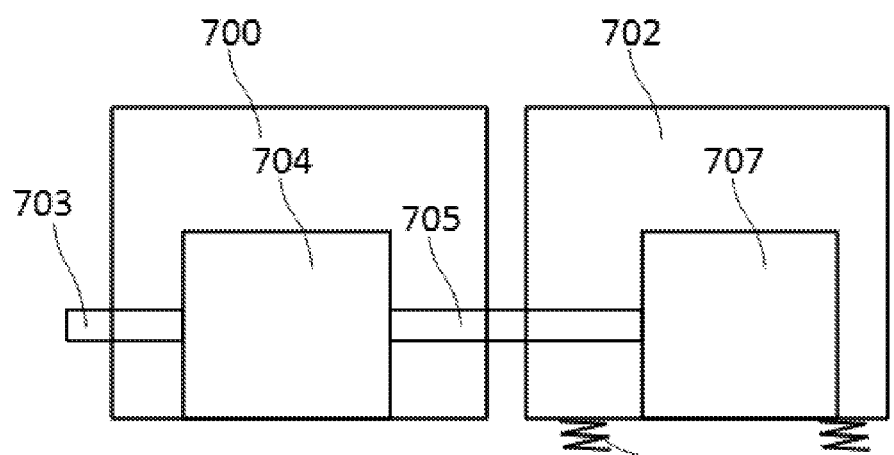
FIG. 7 is a schematic representation of a lateral view of yet another nacelle arrangement that may be used in embodiments of the present invention.

FIG. 7 is a schematic representation of a lateral view of another nacelle suitable for embodiments of the wind turbine. This nacelle comprises a front nacelle casing 700 and a rear nacelle casing 702. The front nacelle casing 700 houses a gearbox 704, a portion of a low speed rotor shaft 703 and a portion of a high speed rotor shaft 705. The rear nacelle casing 702 houses a generator 707 and another portion of the high speed rotor shaft 705. The front nacelle casing 700 would be rigidly coupled to a wind turbine support structure (not shown).

A first end of the low speed rotor shaft 703 may be coupled to a wind turbine rotor (not shown) and a second end of the low speed rotor shaft 703 may be coupled to the gearbox 704. A first end of the high speed rotor shaft 705 may be coupled to the gearbox 704 and a second end of the high speed rotor shaft 705 may be coupled to the generator 707.

The rear nacelle casing 702 may be elastically coupled to a wind turbine support structure (not shown) through a suitable elastic coupling 708. In some configurations, the front and rear nacelle casings 700, 702 may be the front and rear nacelle casings 200, 202 of FIG. 2, or the front and rear nacelle casings 301, 305 of FIG. 3, or the front and rear nacelle casings 401, 405 of FIG. 4, etc. In all these examples, the rear nacelle casing 702 would constitute a wind turbine damper region 108 (see FIG. 1) elastically coupled to a corresponding wind turbine region to be damped 107 (see FIG. 1) which would include the front nacelle casing 700 (since it is rigidly coupled to the wind turbine support structure).

The second end of the high speed rotor shaft 705 may be coupled to the generator 707 through a typical flexible coupling for permitting a smooth torque transmission (without stress induction) from the gearbox 603 to the generator 707. This typical flexible coupling would not therefore play any TMD role.

Figure 8:
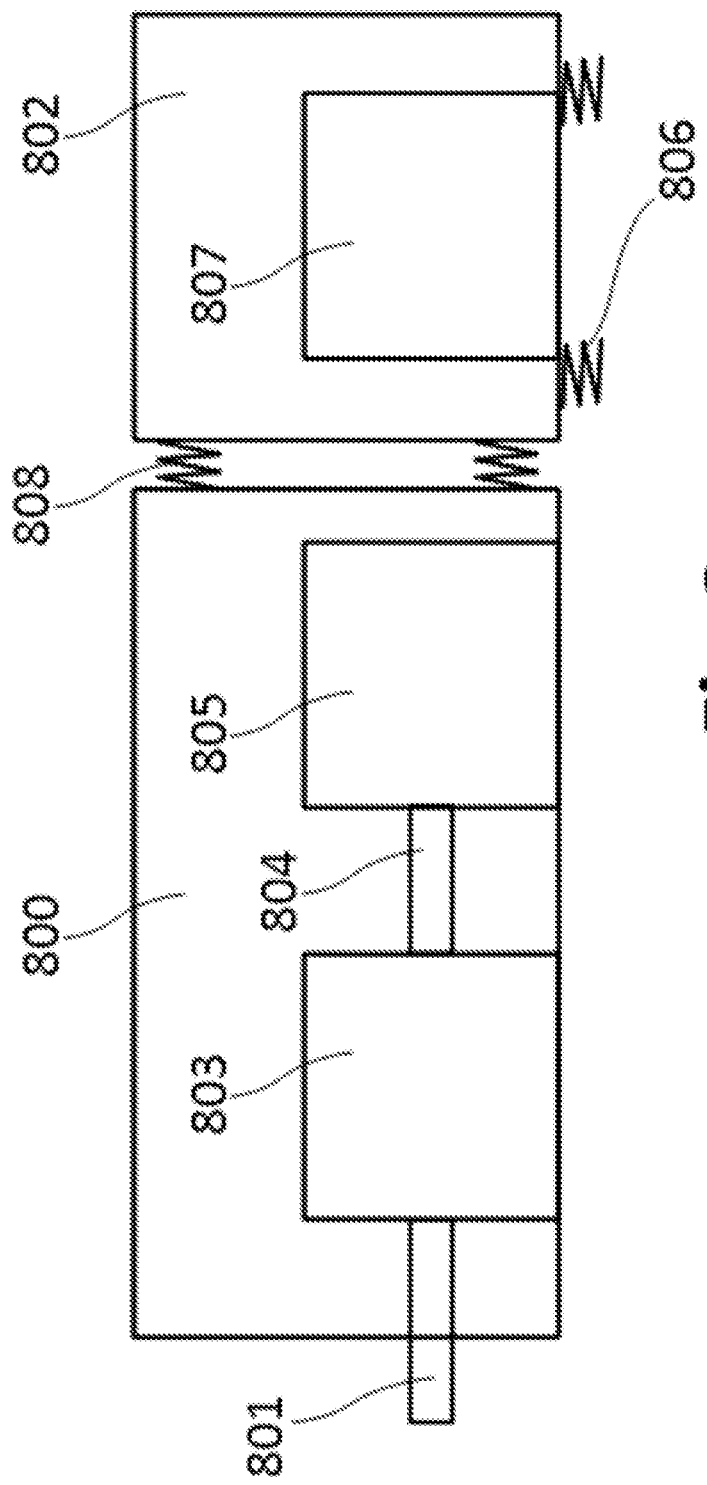
FIG. 8 is a schematic representation of a lateral view of a further nacelle arrangement that may be used in embodiments of the present invention.

FIG. 8 is a schematic representation of a lateral view of a further nacelle arrangement that may be used in embodiments of the present invention. This nacelle comprises a front nacelle casing 800, a rear nacelle casing 802, and an elastic coupling 808 between said nacelle casings 800, 802. The front nacelle casing 800 would be rigidly coupled to a wind turbine support structure (not shown) such that they would constitute a wind turbine region to be damped 107 (see FIG. 1). The rear nacelle casing 802 would constitute a wind turbine damper region 108 (see FIG. 1).

The front nacelle casing 800 is shown housing a gearbox 803, a generator 805 and a high speed rotor shaft 804 between the gearbox 803 and generator 805. The front nacelle casing 800 is shown further housing a portion of a low speed rotor shaft 801 which may operationally couple a wind turbine rotor (not shown) and the gearbox 803. The rear nacelle casing 802 is shown housing a transformer 807, even though it may further house other electric or electronic components, such as e.g. converters.

The rear nacelle casing 802 may further be elastically coupled to the wind turbine support structure (not shown) through a suitable elastic coupling 806. In some configurations, the front and rear nacelle casings 800, 802 may be the front and rear nacelle casings 200, 202 of FIG. 2, or the front and rear nacelle casings 301, 305 of FIG. 3, or the front and rear nacelle casings 401, 405 of FIG. 4, etc.

An aspect of this example is that drive train components 801, 803-805 are included in the wind turbine region to be damped 107, whereas electric/electronic components 807 are included in the wind turbine damper region 108. In this case, drive train components 801, 803-805 would thus not be subjected to oscillations of the damper region 108. This may reduce the risk of damage of all or some of the drive train components in comparison with the configurations of FIGS. 6 and 7.

In the hereinbefore described examples, springs have been indicated to denote the elastic or viscoelastic couplings. The direction or arrangement of the springs in these examples should be understood as the principal axis of the elastic coupling, i.e. the axis of most flexibility. Even though the couplings will inherently also have a certain flexibility in other directions, these have herein been disregarded for the sake of simplicity.

In any of the previously described embodiments, the elastic coupling(s) between the damper region and the region to be damped may be configured in such a way that it (they) may have different (significant) stiffnesses in different directions. Taking this into account, a single elastic coupling could be suitably designed for damping oscillations in different directions (e.g. side-to-side and fore-aft oscillations). In this case, different direction-dependent stiffnesses may thus be chosen depending on the bending mode to be damped in each desired direction.

Figure 9:
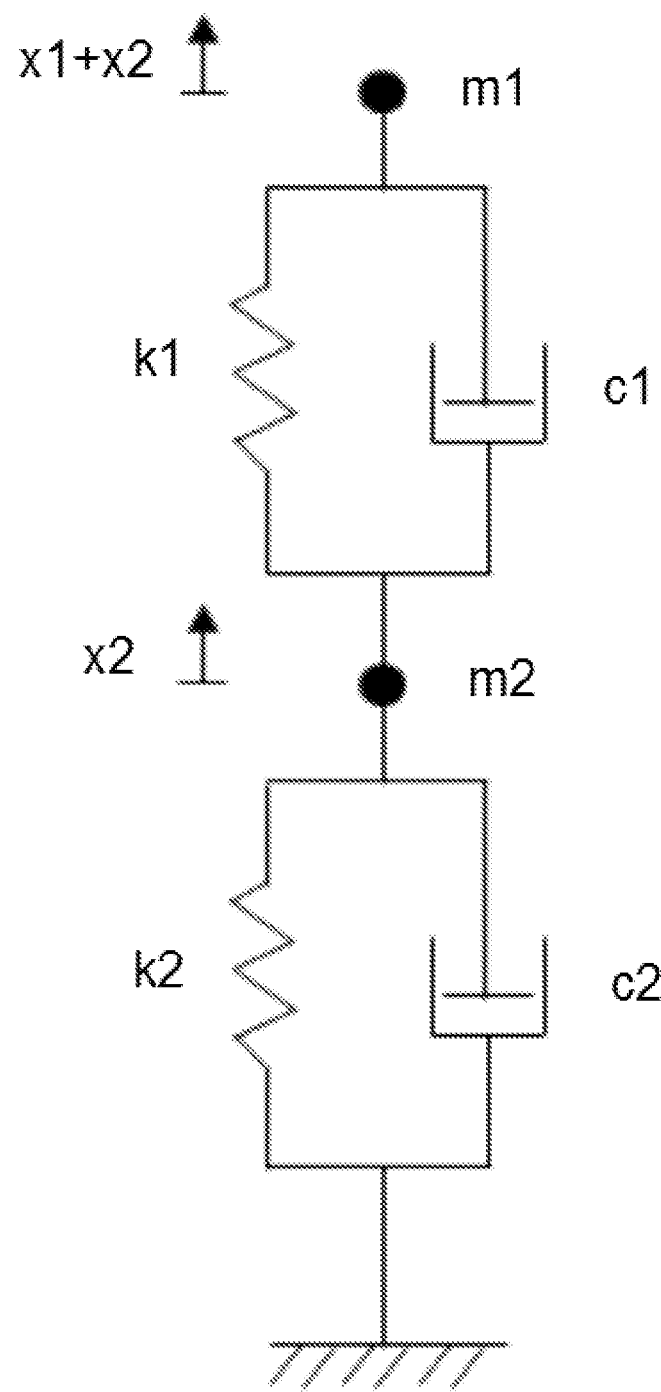
FIG. 9 is a schematic representation of a tuned mass damper model of a wind turbine according to an embodiment.

FIG. 9 is a schematic representation of a tuned mass damper (TMD) model of a wind turbine according to an embodiment provided by the invention, said turbine comprising a region to be damped 107 (see FIG. 1) and a damper region 108 (see FIG. 1). This model will be used to describe an embodiment of the method of determining a suitable stiffness of the elastic coupling of the damper region to the region to be damped of any one of the previously described wind turbines.

The damper region 108 of the wind turbine may be modelled as a first spring-mass-damper system (k1, m1, c1) and the wind turbine region to be damped 107 may be modelled as a second spring-mass-damper system (k2, m2, c2).

The wind turbine region to be damped 107 may be seen as a mass m2 mounted to the ground through a spring k2 and a damper c2. The damper region 108 of the wind turbine may be seen as a mass m1 mounted on (or coupled to) the mass m2 through a spring k1 and a damper c1. In this context, the elastic coupling of the damper region 108 to the region to be damped 107 would be modelled by spring k1 and damper c1.

The parameter m2 would not be the complete mass of the wind turbine region to be damped 107, but it would be the modal mass of said region 107, i.e. the mass of the wind turbine region to be damped 107 which moves as a result of an oscillation. For example, if an element (or part of it) included in the region to be damped 107 is not moved as a result of a particular tower bending mode, the mass of said element (or part of it) would not be included in the modal mass of the region to be damped 107 for that tower bending mode.

In the model of FIG. 9, motion is described by the motion x2 of the region to be damped 107 (modal mass m2) and the relative motion x1 of the damper region 108 (mass m1).

The design of a TMD (damper region 108) mounted on a region to be damped 107 typically involves the following three parameters:

(1) Angular frequency $\omega 2$ of the modal mass to be damped m2 (eigenfrequency depending on the tower bending mode to be attenuated), which may be defined as follows:

$$\omega 2^2 = \frac{k2}{m2} \qquad \text{Eq. 1}$$

(2) Angular frequency $\omega 1$ of the damper mass m1, which may defined as follows:

$$\omega 1^2 = \frac{k1}{m1} \qquad \text{Eq. 2}$$

(3) Damping ratio $\xi 1$ of the damper mass m1, which may be defined as follows:

$$\xi 1 = \frac{c1}{2 \cdot \omega 1 \cdot m1} \qquad \text{Eq. 3}$$

According to TMD principles, a good estimate for an optimal $\omega 1$ and $\xi 1$ may be given by:

$$\omega 1 = \frac{\omega 2}{1 + \left(\frac{m1}{m2}\right)} \qquad \text{Eq. 4}$$

$$\xi 1 = \sqrt{\frac{3}{8} \cdot \frac{\frac{m1}{m2}}{1 + \frac{m1}{m2}}} \qquad \text{Eq. 5}$$

The following equation may be inferred from the equations 1, 2 and 4:

$$\sqrt{\frac{k1}{m1}} = \frac{\sqrt{\frac{k2}{m2}}}{1 + \left(\frac{m1}{m2}\right)} \qquad \text{Eq. 6}$$

The following equation may be inferred from the equations 2, 3 and 5:

$$\frac{c1}{2 \cdot \sqrt{\frac{k1}{m1}} \cdot m1} = \sqrt{\frac{3}{8} \cdot \frac{\frac{m1}{m2}}{1 + \frac{m1}{m2}}} \qquad \text{Eq. 7}$$

The equations 6 and 7 constitute an equations system with three known parameters and two unknown parameters. The parameters m2, k2 about the wind turbine region to be damped 107 may be calculated by using any modal analysis method known in the art. The parameter m1 is also known because it refers to the mass of the damper region 108 of the wind turbine (at least a nacelle part or casing). The parameters k1, c1 are therefore the only unknown parameters of the system of equations 6 and 7.

Resolution of said equations system may thus provide corresponding values for said parameters k1, c1, from which a suitable stiffness of the elastic coupling 106 of the damper region 108 to the region to be damped 107 may be determined.

This method may be used to determine more than one stiffness when having elastic couplings suitable for damping both fore-aft and side-to-side oscillations depending on respective tower bending modes. With respect to FIG. 3, for example, this method may be used for calculating the stiffness of the elastic coupling 302 (for damping fore-aft oscillations) and the stiffness of the elastic couplings 304 and 306 (for damping side-to-side oscillations). With respect to FIG. 4, for example, this method may be used for calculating the stiffness of the elastic coupling 404 (for damping fore-aft oscillations) and the stiffness of the elastic couplings 400 and 402 (for damping side-to-side oscillations).

Although only a number of particular embodiments and examples of the invention have been disclosed herein, it will be understood by those skilled in the art that other alternative embodiments and/or uses of the invention and obvious modifications and equivalents thereof are possible. Furthermore, the present invention covers all possible combinations of the particular embodiments described. Thus, the scope of the present invention should not be limited by particular embodiments, but should be determined only by a fair reading of the claims that follow.

The invention claimed is:

1. A wind turbine comprising:
a support structure comprising a tower; and
a nacelle mounted on the support structure;
wherein:
a first region of the wind turbine is a damper region and includes a whole of the nacelle, the first region flexibly coupled with flexible couplings to a second region of the wind turbine that is a region to be damped and includes at least the support structure, such that a tuned mass damper is formed by the damper region and the region to be damped wherein the damper region has a modal mass and the flexible couplings have a stiffness such that an oscillation frequency of the damper region is tuned to a structural frequency of the region to be damped.

2. A wind turbine according to claim 1, further comprising:
one or more of the following electric/electronic components: one or more transformers, one or more electric cabinets, one or more converters;
and wherein:
the nacelle houses at least part of the one or more electric/electronic components.

3. A wind turbine comprising:
a support structure comprising a tower; and
a nacelle mounted on the support structure;
a first region of the wind turbine is a damper region and includes a first part of the nacelle, the first region flexibly coupled to a second region of the wind turbine that is a region to be damped and includes at least the support structure, such that a tuned mass damper is formed by the damper region and the region to be damped;
a second part of the nacelle is rigidly coupled to the support structure, the second part of the nacelle included in the second region of the wind turbine;
the flexible coupling of the first region to the second region of the wind turbine comprises a flexible coupling of the first part of the nacelle to the second part of the nacelle;
the first part of the nacelle comprises a rear part of the nacelle, and the second part of the nacelle comprises a front part of the nacelle;
first and second lateral walls extending rearwardly from the front part of the nacelle in such a way that the rear part of the nacelle is arranged at least partially between the first and second lateral walls;
wherein:
the first and second lateral walls are rigidly coupled to the front part of the nacelle and/or to the support structure;
the first and second laterals walls are included in the second region of the wind turbine; and
the flexible coupling of the first region to the second region of the wind turbine comprises a flexible coupling of the rear part of the nacelle to the first lateral wall and a flexible coupling of the rear part of the nacelle to the second lateral wall.

4. A wind turbine according to claim 3, wherein:
the flexible coupling of the rear part of the nacelle to the front part of the nacelle has a first stiffness;
the flexible couplings of the rear part of the nacelle to the first and second lateral walls have a second stiffness; and
the first stiffness and the second stiffness are different in order to damp different tower bending modes.

5. A wind turbine comprising:
a support structure comprising a tower; and
a nacelle mounted on the support structure;
a first region of the wind turbine is a damper region and includes a first part of the nacelle, the first region flexibly coupled to a second region of the wind turbine that is a region to be damped and includes at least the support structure, such that a tuned mass damper is formed by the damper region and the region to be damped;
a second part of the nacelle is rigidly coupled to the support structure, the second part of the nacelle included in the second region of the wind turbine;
the flexible coupling of the first region to the second region of the wind turbine comprises a flexible coupling of the first part of the nacelle to the second part of the nacelle;
the first part of the nacelle comprises a rear part of the nacelle, and the second part of the nacelle comprises a front part of the nacelle;
the flexible coupling of the rear part of the nacelle to the front part of the nacelle comprises a flexible coupling of a front side of the rear part of the nacelle to a rear side of the front part of the nacelle;
the first part of the nacelle further comprises a first lateral part of the nacelle and a second lateral part of the nacelle;
the first lateral part of the nacelle is flexibly coupled to a lateral side of at least the front part of the nacelle; and
the second lateral part of the nacelle is flexibly coupled to an opposite lateral side of at least the front part of the nacelle.

6. A wind turbine according to claim 5, wherein:
the flexible coupling of the rear part of the nacelle to the front part of the nacelle has a first stiffness;
the flexible couplings of the first and second lateral parts of the nacelle to at least the front part of the nacelle have a second stiffness; and
the first stiffness and the second stiffness are different in order to damp different tower bending modes.

7. A wind turbine according to claim 5, further comprising:
one or more of the following electric/electronic components: one or more transformers, one or more electric cabinets, one or more converters;
wherein:
the first lateral part of the nacelle houses a first part of the one or more electric/electronic components; and
the second lateral part of the nacelle houses a second part of the one or more electric/electronic components.

8. A wind turbine comprising:
a support structure comprising a tower; and
a nacelle mounted on the support structure;
a first region of the wind turbine is a damper region and includes a first part of the nacelle, the first region flexibly coupled to a second region of the wind turbine that is a region to be damped and includes at least the support structure, such that a tuned mass damper is formed by the damper region and the region to be damped;

a second part of the nacelle is rigidly coupled to the support structure, the second part of the nacelle included in the second region of the wind turbine;

the flexible coupling of the first region to the second region of the wind turbine comprises a flexible coupling of the first part of the nacelle to the second part of the nacelle;

the first part of the nacelle comprises a rear part of the nacelle, and the second part of the nacelle comprises a front part of the nacelle;

the flexible coupling of the rear part of the nacelle to the front part of the nacelle comprises a flexible coupling of a front side of the rear part of the nacelle to a rear side of the front part of the nacelle;

first and second lateral walls extending rearwardly from the front part of the nacelle in such a way that the rear part of the nacelle is arranged at least partially between the first and second lateral walls;

wherein:

the first and second lateral walls are rigidly coupled to the front part of the nacelle or to the support structure;

the first and second laterals walls are included in the second region of the wind turbine; and the flexible coupling of the first region to the second region of the wind turbine comprises a flexible coupling of the rear part of the nacelle to the first lateral wall and a flexible coupling of the rear part of the nacelle to the second lateral wall.

9. A wind turbine comprising:

a support structure comprising a tower; and a nacelle mounted on the support structure;

a first region of the wind turbine is a damper region and includes a first part of the nacelle, the first region flexibly coupled to a second region of the wind turbine that is a region to be damped and includes at least the support structure, such that a tuned mass damper is formed by the damper region and the region to be damped;

a second part of the nacelle is rigidly coupled to the support structure, the second part of the nacelle included in the second region of the wind turbine;

the flexible coupling of the first region to the second region of the wind turbine comprises a flexible coupling of the first part of the nacelle to the support structure;

the flexible coupling of the first region to the second region of the wind turbine comprises a flexible coupling of the first part of the nacelle to the second part of the nacelle;

the first part of the nacelle comprises a rear part of the nacelle, and the second part of the nacelle comprises a front part of the nacelle;

first and second lateral walls extending rearwardly from the front part of the nacelle in such a way that the rear part of the nacelle is arranged at least partially between the first and second lateral walls;

wherein:

the first and second lateral walls are rigidly coupled to the front part of the nacelle and/or to the support structure;

the first and second laterals walls are included in the second region of the wind turbine; and the flexible coupling of the first region to the second region of the wind turbine comprises a flexible coupling of the rear part of the nacelle to the first lateral wall and a flexible coupling of the rear part of the nacelle to the second lateral wall.

* * * * *